United States Patent [19]

Inahara et al.

[11] Patent Number: 5,384,298
[45] Date of Patent: Jan. 24, 1995

[54] CATALYST FOR POLYMERIZATION OF OLEFIN AND PROCESS FOR PRODUCTION OF OLEFIN POLYMER

[75] Inventors: Kiyoshi Inahara; Akihiro Yano, both of Mie, Japan

[73] Assignee: Tosoh Corporation, Shinnanyo, Japan

[21] Appl. No.: 997,184

[22] Filed: Dec. 28, 1992

[30] Foreign Application Priority Data

Dec. 27, 1991 [JP] Japan .................. 3-358191

[51] Int. Cl.$^6$ .......................... B01J 31/00
[52] U.S. Cl. ................. 502/104; 502/103; 502/117
[58] Field of Search ............. 502/103, 104, 117

[56] References Cited

U.S. PATENT DOCUMENTS 5,003,019 3/1991 Ishimaru et al. ............ 526/281
5,026,797 6/1991 Takahashi ................... 502/117

FOREIGN PATENT DOCUMENTS 0523416 1/1993 European Pat. Off. .

OTHER PUBLICATIONS

Journal of Polymer Science Part A: Polymer Chemistry Edition, vol. 29, No. 11, Oct. 1991, pp. 1603–1607, J. C. W. Chien, et al., "Olefin Copolymerization With Matallocene Catalysts III. Supported Metallocene/Methylaluminoxane Catalyst For Olefin Copolymerization".

Die Makromolekulare Chemie, Rapid Communications, vol. 12, No. 6, Jun. 1991, pp. 367–372 M. Kaminaka, et al., "Polymerization Of Propene With The Catalyst Systems Composed of Al$_2$O$_3$— or MgCl$_2$-Supported Et(IndH$_4$)$_2$ZrCl$_2$ and AlR$_3$ (R=CH$_3$, C$_2$H$_5$)".

*Primary Examiner*—Helen M. S. Sneed
*Assistant Examiner*—F. D. Irzinski
*Attorney, Agent, or Firm*—Oblon, Spivak, McClelland, Maier, & Neustadt

[57] ABSTRACT

A catalyst for polymerization of an olefin, is provided which contains a solid catalyst component (A) obtained by supporting a transition metal compound having formula (1):

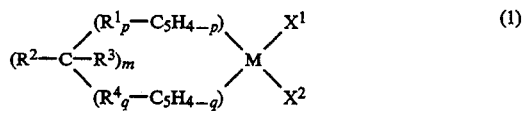

onto a solid inorganic compound, and then washing the solid inorganic compound with a nonaqueous solvent capable of dissolving the transition metal compound, where M is a transition metal of Group 4b; $X^1$ and $X^2$ are, independently, a halogen, hydrogen, an alkylalkoxy group, a saturated or unsaturated alkyl group; $R^1$, $R^2$, $R^3$ and $R^4$ are, independently, hydrogen or a saturated or unsaturated $C_{1-100}$ alkyl group; m is an integer of 1 to 6; and p and q are, independently, an integer of 0 to 4, and a catalyst component (B) containing an organic aluminum compound having formula (2):

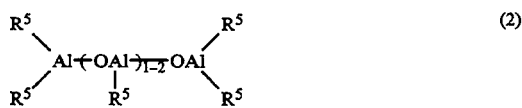

where 1, is an integer of 2 to 100, $R^5$ is a $C_{1-6}$ alkyl group, and/or an organic aluminum compound having formula (3)

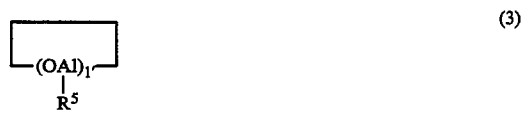

where 1' is an integer of 2 to 100, and $R^5$ is a $C_{1-6}$ alkyl group. A process for producing an olefin polymer is also provided in which this catalyst is employed. The catalyst is prepared with low amounts of organic aluminoxane, yet has high activity.

18 Claims, No Drawings

CATALYST FOR POLYMERIZATION OF OLEFIN AND PROCESS FOR PRODUCTION OF OLEFIN POLYMER

BACKGROUND OF THE INVENTION

1. Field of the Invention

The present invention relates to a catalyst which contains a transition metal compound having a high activity for polymerization of an olefin. The present invention also relates to a process for producing an olefin polymer by use of the catalyst.

2. Discussion of the Background

As an olefin polymerization catalyst, soluble metallocene catalysts are well known which are based on combinations of a bis(cyclopentadienyl)titanium-alkyl or a bis(cyclopentadienyl)titanium halide, as a transition metal compound, with an organoaluminoxane. An example is disclosed in U.S. Pat. No. 4,522,982. In such catalysts, the organoaluminoxane is used in an amount of several thousand times the transition metal compound to obtain high catalyst activity. Aluminoxanes, however, are very expensive so that the catalysts are not suitable for industrial production of general-purpose polyolefin resins.

An isotactic polypropylene is produced by suspension polymerization using a catalyst containing an aluminoxane and ethylene-bis(4,5,6,7-tetrahydro-1-indenyl)zirconium dichloride as a transition metal compound (see e.g., EP 185,918). In this polymerization process a large amount of an organic aluminoxane is also necessarily required to obtain high catalyst activity, resulting in low activity for aluminum of the organic aluminoxane.

In another process, polypropylene is produced without accumulation of the polymer onto the wall of a reaction vessel by use of a catalyst containing a solid component derived by bringing dimethylsilyl-bis(2,4-dimethylcyclopentadienyl)zirconium dichloride as a transition metal compound into contact with an organic aluminoxane-treated silica, and methylaluminoxane as an organic aluminoxane (Japanese Patent Application laid-open No. Hei-3-74412). In this polymerization process the organoaluminoxane is also used in a large amount in preliminary treatment of silica and polymerization, resulting in low activity for aluminum of the organic aluminoxane.

The inventors of the present invention have made comprehensive investigations to solve the above problems of the prior art, and have found that the use of a transition metal compound supported by a solid inorganic compound enables the use of smaller amounts of the expensive organic aluminoxane compound and yet gives a highly active catalyst for olefin polymerization.

SUMMARY OF THE INVENTION

The present invention provides a novel catalyst for polymerization of olefins, the catalyst employing a transition metal compound and a decreased amount of an expensive organic aluminoxane, and yet having high catalytic activity.

The present invention provides a catalyst for polymerization of an olefin, comprising a solid catalyst component (A) derived by depositing a transition metal compound represented by the general formula (1):

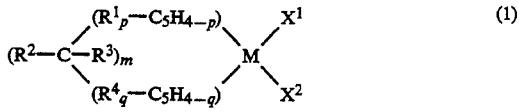

onto a solid inorganic compound, and then washing the solid inorganic compound with a nonaqueous solvent capable of dissolving the transition metal compound, where M is a transition metal of Group 4b of the Periodic Table of Elements; $X^1$ and $X^2$ are, independently, a halogen, hydrogen, an alkylalkoxy group, or a saturated or unsaturated alkyl group; $R^1$, $R^2$, $R^3$ and $R^4$ are, independently, hydrogen or a saturated or unsaturated alkyl group of 1 to 100 carbons; m is an integer of 1 to 6; and p and q are, independently, an integer of 0 to 4, and a catalyst component (B) comprising an organic aluminum compound represented by the general formula (2)

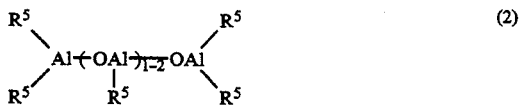

where 1 in formula (2) is an integer of 2 to 100, and $R^5$ is an alkyl group of 1 to 6 carbons, and/or an organic aluminum compound of formula (3)

where 1' in formula (3) is an integer of 2 to 100, and $R^5$ is an alkyl group of 1 to 6 carbons.

The present invention also provides a process for producing an olefin polymer employing the above catalyst for polymerization of the olefin.

DETAILED DESCRIPTION OF THE PREFERRED EMBODIMENTS

The transition metal in the catalyst component (A) of the olefin polymerization catalyst of the present invention is represented by the general formula (1). The transition metal M in the general formula is an element of Group 4b of the Periodic Table Elements, including titanium, zirconium, and hafnium, among which zirconium and hafnium are preferred.

$X^1$ and $X^2$ are independently a halogen, hydrogen, an alkylalkoxy group, or a saturated or unsaturated alkyl group. The halogen includes specifically fluorine, chlorine, bromine, and iodine, among which chlorine is preferred. The alkylalkoxy group includes primary, secondary, and tertiary alkylalkoxy groups of 1 to 100 carbons, preferably 1 to 6 carbons. The saturated or unsaturated alkyl group includes hydrocarbon groups of 1 to 100 carbons, preferably 1 to 6 carbons. The saturated or unsaturated alkyl group of 1 to 6 carbons are linear, branched, or cyclic alkyl groups, specifically including methyl, ethyl, ethenyl, n-propyl, isopropyl, propenyl, n-butyl, isobutyl, t-butyl, butenyl, n-pentyl, isopentyl, t-pentyl, pentenyl, n-hexyl, isohexyl, cyclohexyl, benzyl, etc. $X^1$ and $X^2$ may be the same or different, or may be linked together to form a bond. The linked alkyl group includes linear, branched, or cyclic bivalent alkyl groups such as ethylene, trimethylene, propenylene, tetramethylene, butylenylene, pentamethylene, pentenylene, hexamethylene, hexenylene, cyclohexenylene, and benzylidene.

$R^1$, $R^2$, $R^3$ and $R^4$ are, independently, hydrogen or a saturated or unsaturated hydrocarbon group of 1 to 100 carbons, preferably hydrogen or a hydrocarbon group of 1 to 6 carbons. The alkyl group of 1 to 6 carbons includes linear, branched and cyclic alkyl groups such as methyl, ethyl, ethenyl, n-propyl, isopropyl, propenyl, n-butyl, isobutyl, t-butyl, butenyl, n-pentyl, isopentyl, t-pentyl, pentenyl, n-hexyl, isohexyl, cyclohexyl, and benzyl.

The groups of $R^2$ and $R^3$, the two $R^1$ groups when p is 2 or more, and the two $R^4$ groups when q is 2 or more may respectively linked together to form a bond. The linked group includes linear, branched, or cyclic bivalent alkyl groups such as ethylene, trimethylene, propenylene, tetramethylene, butenylene, butadienylene, pentamethylene, pentenylene, hexamethylene, hexenylene, cyclohexenylene, and benzylidene.

The size (m) of the linking group between the two cyclopentadienyl groups or derivatives thereof is denoted by an integer of 1 to 6, preferably 1 or 2. The symbols of p and q, which may be the same or different, are respectively the number of the substituents on the cyclopentadienyl ring, and are an integer of 0 to 4.

The transition metal compounds used for forming the catalyst component (A), in the case where the transition metal M is zirconium, and $X^1$ and $X^2$ are chlorine, includes: methylenebis(cyclopentadienyl)zirconium dichloride, methylenebis(2-methylcyclopentadienyl)zirconium dichloride, methylenebis(3-methylcyclopentadienyl)zirconium dichloride, methylenebis(2-methylcyclopentadienyl)(3-methylcyclopentadienyl)zirconium dichloride, methylenebis(2,3-dimethylcyclopentadienyl)zirconium dichloride, methylenebis(2,4-dimethylcyclopentadienyl)zirconium dichloride, methylenebis(2,5-dimethylcyclopentadienyl)zirconium dichloride, methylenebis(3,4-dimethylcyclopentadienyl)zirconium dichloride, methylene(2,3-dimethylcyclopentadienyl)(2,4-dimethylcyclopentadienyl)zirconium dichloride, methylene(2,3-dimethylcyclopentadienyl)(2,5-dimethylcyclopentadienyl)zirconium dichloride, methylene(2,3-dimethylcyclopentadienyl)(3,4-dimethylcyclopentadienyl)zirconium dichloride, methylene(2,4-dimethylcyclopentadienyl)(2,5-dimethylcyclopentadienyl)zirconium dichloride, methylene(2,4-dimethylcyclopentadienyl)(3,4-dimethylcyclopentadienyl)zirconium dichloride, methylenebis(2,3,4-trimethylcyclopentadienyl)zirconium dichloride, methylenebis(2,3,5-trimethylcyclopentadienyl)zirconium dichloride, methylenebis(2,3,4,5-tetramethylcyclopentadienyl)zirconium dichloride, methylenebis(ethylcyclopentadienyl)zirconium dichloride, methylenebis(diethylcyclopentadienyl)zirconium dichloride, methylenebis(indenyl)zirconium dichloride, isopropylidene(cyclopentadienyl-methylcyclopentadienyl)zirconium dichloride, isopropylidene(cyclopentadienyl-dimethylcyclopentadienyl)zirconium dichloride, isopropylidene(cyclopentadienyl-trimethylcyclopentadienyl)zirconium dichloride, isopropylidene(cyclopentadienyl-tetramethylcyclopentadienyl)zirconium dichloride, isopropylidene(cyclopentadienyl-ethylcyclopentadienyl)zirconium dichloride, isopropylidene(cyclopentadienyl-diethylcyclopentadienyl)zirconium dichloride, isopropylidene(cyclopentadienyl-triethylcyclopentadienyl)zirconium dichloride, isopropylidene(cyclopentadienyl-tetraethylcyclopentadienyl)zirconium dichloride, isopropylidene(cyclopentadienyl-fluorenyl)zirconium dichloride, isopropylidene(cyclopentadienyl-2,7-di-t-butylfluorenyl)zirconium dichloride, isopropylidene(cyclopentadienyl-octahydrofluorenyl)zirconium dichloride, isopropylidene(methylcyclopentadienyl-fluorenyl)zirconium dichloride, isopropylidene(dimethylcyclopentadienyl-fluorenyl)zirconium dichloride, isopropylidene(trimethylcyclopentadienyl-fluorenyl)zirconium dichloride, isopropylidene(tetramethylcyclopentadienyl-fluorenyl)zirconium dichloride, isopropylidene(ethylcyclopentadienyl-fluorenyl)zirconium dichloride, isopropylidene(diethylcyclopentadienyl-fluorenyl)zirconium dichloride, isopropylidene(methylcyclopentadienyl-2,7-di-t-butylfluorenyl)zirconium dichloride, isopropylidene(dimethylcyclopentadienyl-2,7-di-t-butylfluorenyl)zirconium dichloride, isopropylidene(trimethylcyclopentadienyl-2,7-di-t-butylfluorenyl)zirconium dichloride, isopropylidene(tetramethylcyclopentadienyl-2,7-di-t-butylfluorenyl)zirconium dichloride, isopropylidene(ethylcyclopentadienyl-2,7-di-t-butylfluorenyl)zirconium dichloride, isopropylidene(diethylcyclopentadienyl-2,7-di-t-butylfluorenyl)zirconium dichloride, isopropylidene(methylcyclopentadienyl-octahydrofluorenyl)zirconium dichloride, isopropylidene(dimethylcyclopentadienyl-octahydrofluorenyl)zirconium dichloride, isopropylidene(trimethylcyclopentadienyl-octahydrofluorenyl)zirconium dichloride, isopropylidene(tetramethylcyclopentadienyl-octahydrofluorenyl)zirconium dichloride, isopropylidene(ethylcyclopentadienyl-octahydrofluorenyl)zirconium dichloride, isopropylidene(diethylcyclopentadienyl-octahydrofluorenyl)zirconium dichloride, cyclohexylidene(cyclopentadienyl-methylcyclopentadienyl)zirconium dichloride, cyclohexylidene(cyclopentadienyl-dimethylcyclopentadienyl)zirconium dichloride, cyclohexylidene(cyclopentadienyl-trimethylcyclopentadienyl)zirconium dichloride, cyclohexylidene(cyclopentadienyl-tetramethylcyclopentadienyl)zirconium dichloride, cyclohexylidene(cyclopentadienyl-ethylcyclopentadienyl)zirconium dichloride, cyclohexylidene(cyclopentadienyl-diethylcyclopentadienyl)zirconium dichloride, cyclohexylidene(cyclopentadienyl-triethylcyclopentadienyl)zirconium dichloride, cyclohexylidene(cyclopentadienyl-tetraethylcyclopentadienyl)zirconium dichloride, cyclohexylidene(cyclopentadienyl-fluorenyl)zirconium dichloride, cyclohexylidene(cyclopentadienyl-2,7-di-t-butylfluorenyl)zirconium dichloride, cyclohexylidene(cyclopentadienyl-octahydrofluorenyl)zirconium dichloride, cyclohexylidene(methylcyclopentadienyl-fluorenyl)zirconium dichloride, cyclohexylidene(dimethylcyclopentadienyl-fluorenyl)zirconium dichloride, cyclohexylidene(trimethylcyclopentadienyl-fluorenyl)zirconium dichloride, cyclohexylidene(tetramethylcyclopentadienyl-fluorenyl)zirconium dichloride, cyclohexylidene(ethylcyclopentadienyl-fluorenyl)zirconium dichloride, cyclohexylidene(diethylcyclopentadienyl-fluorenyl)zirconium dichloride, cyclohexylidene(methylcyclopentadienyl-2,7-di-t-butylfluorenyl)zirconium dichloride, cyclohexylidene(dimethylcyclopentadienyl-2,7-di-t-butylfluorenyl)zirconium dichloride, cyclohexylidene(trimethylcyclopentadienyl-2,7-di-t-butylfluorenyl)zirconium dichloride, cyclohexylidene(tetramethylcyclopentadienyl-2,7-di-t-butylfluorenyl)zirconium dichloride, cyclohexylidene(ethylcyclopentadienyl-2,7-di-t-butylfluorenyl)zirconium dichloride, cyclohexylidene(diethylcyclopentadienyl-2,7-di-t-butylfluorenyl)zirconium dichloride, cyclohexylidene(methylcyclopentadienyl-octahydrofluorenyl)zirconium dichloride, cyclohexylidene(dimethylcyclopentadienyl-octahydrofluorenyl)zirconium dichloride, cyclohexylidene(trimethylcyclopentadienyl-octahydrofluorenyl)zirconium dichloride, cyclohexylidene(tetramethylcyclopentadienyl-octahydrofluorenyl)zirconium dichloride, cyclohexylidene(ethylcyclopentadienyl-octahydrofluorenyl)zirconium dichloride, cyclohexylidene(diethylcyclopentadienyl-octahydrofluorenyl)zirconium dichloride, diphenylmethylene(cyclopentadienyl-methylcyclopentadienyl)zirconium dichloride, diphenylmethylene(cyclopentadienyl-dimethylcyclopentadienyl)zirconium dichloride, diphenylmethylene(cyclopentadienyl-trimethylcyclopentadienyl)zirconium dichloride, diphenylmethylene(cyclopentadienyl-tetramethylcyclopentadienyl)zirconium dichloride, diphenylmethylene(cyclopentadienyl-ethylcyclopentadienyl)zirconium dichloride, diphenylmethylene(cyclopentadienyl-diethylcyclopentadienyl)zirconium dichloride, diphenylmethylene(cyclopentadienyl-triethylcyclopentadienyl)zirconium dichloride, diphenylmethylene(cyclopentadienyl-tetraethylcyclopentadienyl)zirconium dichloride, diphenylmethylene(cyclopentadienyl-fluorenyl)zirconium dichloride, diphenylmethylene(cyclopentadienyl-2,7-di-t-butylfluorenyl)zirconium dichloride, diphenylmethylene(cyclopentadienyl-octahydrofluorenyl)zirconium dichloride, diphenylmethylene(methylcyclopentadienyl-fluorenyl)zirconium dichloride, diphenylmethylene(dimethylcyclopentadienyl-fluorenyl)zirconium dichloride, diphenylmethylene(trimethylcyclopentadienyl-fluorenyl)zirconium dichloride, diphenylmethylene(tetramethylcyclopentadienyl-fluorenyl)zirconium dichloride, diphenylmethylene(ethylcyclopentadienyl-fluorenyl)zirconium dichloride, diphenylmethylene(diethylcyclopentadienyl-fluorenyl)zirconium dichloride, diphenylmethylene(methylcyclopentadienyl-2,7-di-t-butylfluorenyl)zirconium dichloride, diphenylmethylene(dimethylcyclopentadienyl-2,7-di-t-butylfluorenyl)zirconium dichloride, diphenylmethylene(trimethylcyclopentadienyl-2,7-di-t-butylfluorenyl)zirconium dichloride, diphenylmethylene(tetramethylcyclopentadienyl-2,7-di-t-butylfluorenyl)zirconium dichloride, diphenylmethylene(ethylcyclopentadienyl-2,7-di-t-butylfluorenyl)zirconium dichloride, diphenylmethylene(diethylcyclopentadienyl-2,7-di-t-butylfluorenyl)zirconium dichloride, diphenylmethylene(methylcyclopentadienyl-octahydrofluorenyl)zirconium dichloride, diphenylmethylene(dimethylcyclopentadienyl-octahydrofluorenyl)zirconium dichloride, diphenylmethylene(trimethylcyclopentadienyl-octahydrofluorenyl)zirconium dichloride, diphenylmethylene(tetramethylcyclopentadienyl-octahydrofluorenyl)zirconium dichloride, diphenylmethylene(ethylcyclopentadienyl-octahydrofluorenyl)zirconium dichloride, diphenylmethylene(diethylcyclopentadienyl-octahydrofluorenyl)zirconium dichloride, ethylenebis(1-indenyl)zirconium dichloride, ethylenebis(4,5,6,7-tetrahydro-1-indenyl)zirconium dichloride, etc.

For supporting the aforementioned transition metal compound, solid inorganic compounds generally employed in industry are useful. The industrially used solid inorganic compounds include oxides of typical elements, for example, alumina, silica, magnesia, and calcium oxide; oxides of transition metals such as titania, zirconia, and thoria; composites of these oxides; and metal halides such as magnesium chloride and aluminum chloride.

The preferred solid inorganic compounds in the present invention are those having Lewis acidity. Among them, alumina is particularly preferred. The solid inorganic compounds are preferably in a particle form in a size of from 0.01 to 200 $\mu$m, more preferably from 0.1 to 100 $\mu$m.

The solid inorganic compound is generally treated preliminarily by calcination. The calcining is usually conducted at a reduced pressure or in a gas stream at a temperature in the range of from 100° C. to 1200° C., preferably from 200° C. to 900° C. Otherwise, the solid inorganic compound may be preliminarily treated with an organic or inorganic compound which is reactive with hydroxy groups or adsorbed water on the surface of the solid.

The transition metal compound may be supported on the solid inorganic compound by the processes shown below:

(a) processes comprising steps of bringing a solution of the transition metal compound in a nonaqueous solvent into contact with the solid inorganic compound, and washing the resulting solid component with a nonaqueous solvent capable of dissolving the transition metal compound, (b) processes comprising steps of adding the transition metal compound dissolved in a nonaqueous solvent to a nonaqueous slurry of the solid inorganic compound, and washing the resulting solid component with a nonaqueous solvent capable of dissolving the transition metal compound, (c) processes comprising steps of mixing the transition metal compound with the solid inorganic compound, adding a nonaqueous solvent to the mixture, thereby bringing the transition metal compound into sufficient contact with the solid inorganic compound, and then washing the resulting solid component with a nonaqueous solvent capable of dissolving the transition metal compound, and (d) processes comprising steps of bringing the transition metal compound into contact with the solid inorganic compound, and washing the resulting solid component with a nonaqueous solvent capable of dissolving the transition metal compound.

These processes are described by way of example only, and the present invention is not limited to these processes but rather includes any process of bringing the transition metal compound into contact with the inorganic support such that the transition metal compound becomes supported, within the scope of the present invention.

The nonaqueous solvent capable of dissolving the transition metal compound includes aromatic hydrocarbons such as benzene, toluene, and xylene; and halogenated hydrocarbons such as chloroform and methylene chloride. In the above supporting processes, an important point is the washing of the resulting solid component with a nonaqueous solvent capable of dissolving the transition metal compound. In this washing operation, the transition metal compound in the solid component is presumed to interact with the solid inorganic compound, and the interaction is considered to heighten the effect of the present invention. The amount of transition metal compound supported in the solid inorganic compound is not critical so long as enough transition metal compound is present to produce a catalyst with sufficient activity as discussed below.

The supporting treatment of the transition metal compound may be practiced in the presence of an organometallic compound as a third component. The organometallic compound includes organoaluminum compounds, for example $C_{1-6}$ alkylaluminum compounds such as trimethylaluminum, triethylaluminum, and dimethylaluminum chloride; organosilicon compounds, for example $C_{1-6}$ alkyl and/or halogen substituted silanes such as trimethylsilane and dimethyldichlorosilane; and organomagnesium compounds, for example $C_{1-6}$ alkylmagnesium compounds such as dimethylmagnesium and methylmagnesium chloride. Among them, organoaluminum compounds are preferred. In this case the organometal is used in a mole ratio of from 0.01 to 10000, preferably from 1 to 1000 to the transition metal.

The catalyst component (B) is an organoaluminum compound represented by the general formulas (2) and/or (3). In the general formulas (2) and (3), each $R^5$ is, independently, a saturated or unsaturated alkyl group of 1 to 6 carbons. The alkyl group includes linear, branched, and cyclic hydrocarbon groups such as methyl, ethyl, ethenyl, n-propyl, isopropyl, propenyl, n-butyl, isobutyl, t-butyl, butenyl, n-pentyl, isopentyl, t-pentyl, pentenyl, n-hexyl, isohexyl, cyclohexyl, benzyl, etc. Among them, methyl is preferred. The symbols of l and l', are respectively an integer of from 2 to 100, preferably from 6 to 50. The organoaluminum compound may be a commercial product, or may be synthesized by any known method. For example, the organoaluminum compound may be synthesized by bringing an organoaluminum compound into contact with a hydrocarbon solvent in which a water of crystallization containing salt (e.g., aluminum sulfate hydrate and other sulfate hydrate) or a small amount of water is suspended.

The mole ratio of the catalyst component (B) to the transition metal compound in the catalyst component (A) is in the range of from 0.1 to 4000. Sufficient activity is obtained at the ratio of 1000 or less. At the ratio of less than 0.1, the catalyst activity tends to become lower. The catalyst components (A) and (B) may be mixed prior to feeding to the reaction system, or otherwise be fed separately to the reaction system.

The olefin which can be polymerized by the process of the present invention includes α-olefins such as ethylene, propylene, 1-butene, 4-methyl-1-pentene, and 1-hexene; conjugated or unconjugated dienes such as butadiene and 1,4-hexadiene; aromatic vinyls such as styrene; and cyclic olefins such as cyclobutene. A mixture of two or more of these olefins may be polymerized.

The polymerization of the present invention may be conducted through any of the processes of liquid phase polymerization, gas phase polymerization, and bulk polymerization. The solvent for the liquid phase polymerization includes aliphatic hydrocarbons such as pentane, hexane, heptane, octane, nonane, and decane; alicyclic hydrocarbons such as cyclohexane; and aromatic hydrocarbons such as benzene, toluene, and xylene.

The concentration of the catalyst of the present invention in the solution is preferably in the range of $1 \times 10^{-10}$ mol/liter and higher, more preferably from $1 \times 10^{-2}$ to $1 \times 10^{-8}$ mol/liter in terms of the catalyst component (A). The polymerization temperature is not limited specially, and is normally in the range of from $-100°$ C. to $230°$ C. The pressure of the olefin in the reaction is not specially limited, and usually in the range of from atmospheric pressure to 200 $kg/cm^2G$.

Other features of the invention will become apparent in the course of the following descriptions of exemplary embodiments which are given for illustration of the invention and are not intended to be limiting thereof.

EXAMPLES

In the examples, Mw denotes a weight-average molecular weight, Mw/Mn denotes molecular weight distribution measured by gel permeation chromatography (GPC) at $130°$ C. using o-dichlorobenzene as the solvent, and Tm denotes a melting point measured by differential scanning calorimetry (DSC).

Example 1

Preparation of Catalyst Component (A).

In an inert gas atmosphere, 8.3 ml of ethylenebis(1-indenyl)zirconium dichloride solution (10 mmol/liter) in toluene and 0.8 ml of trimethylaluminum solution (2.42 mmol/liter) in toluene were added to 8.24 g of alumina having been calcined at $300°$ C. for 4 hours. The mixture was stirred at room temperature for 10 minutes. The solid product was collected by filtration, washed with 50 ml of toluene, and was dried at a reduced pressure to obtain a solid catalyst component (A). This solid component was found to contain 0.074% by weight of zirconium by elemental analysis.

Polymerization

Into a thoroughly dried 500-ml autoclave, 100 ml of toluene, the above catalyst component (A) in an amount of 0.005 mmol in terms of zirconium, 1.1 mmol of methylaluminoxane (MAO, made by Tosoh-Akzo K.K.), and 150 ml of propylene were charged under an inert gas atmosphere. The polymerization was conducted at $40°$ C. for one hour. The polymerization product was washed with methanol, and dried in vacuum. The result of the polymerization is shown in Table 1.

Comparative Example 1

Polymerization

Into a thoroughly dried 500-ml autoclave, 100 ml of toluene, ethylenebis(1-indenyl)zirconium dichloride solution (10 mmol/liter) in toluene in an amount of 0.005 mmol in terms of zirconium, 1.1 mmol of methylaluminoxane (MAO, made by Tosoh-Akzo K.K.), and 150 ml of propylene were charged under an inert gas atmosphere. The polymerization was conducted at $40°$ C. for one hour. The polymerization product was washed with methanol, and dried in vacuum. The result of the polymerization is shown in Table 1.

Comparative Example 2

Polymerization

Polymerization was conducted in the same manner as in Example 1 except that the amount of the methylaluminoxane was changed to 5.0 mmol. The result is shown in Table 1.

Example 2

Polymerization

Polymerization was conducted in the same manner as in Example 1 except that the polymerization was conducted at $80°$ C. The result is shown in Table 1.

As described above, the present invention provides an olefin polymerization catalyst by use of a transition metal compound and a decreased amount of expensive organic aluminoxane with high activity.

Obviously, numerous modifications and variations of the present invention are possible in light of the above teachings. It is therefore to be understood that within the scope of the appended claims, the invention may be practiced otherwise than as specifically described herein.

TABLE 1

| | Zirconium component (mmol) | MAO (mmol) | Yield (g) | Activity (g/mM-Al.h) | Tm (°C.) | Mw (×10$^{-4}$) | Mw/Mn |
|---|---|---|---|---|---|---|---|
| Example 1 | 0.005 | 1.1 | 17.1 | 15.5 | 143 | 2.67 | 2.15 |
| Comparative example 1 | 0.005 | 1.1 | 9.1 | 8.3 | | | |
| Comparative example 2 | 0.005 | 5.0 | 40.1 | 8.0 | | | -- |
| Example 2 | 0.005 | 1.1 | 66.1 | 60.0 | | | |

What is claimed as new and desired to be secured by Letters Patent of the United States is:

1. A catalyst for polymerization of an olefin, comprising
   a solid catalyst component (A), containing a transition metal compound having formula (1):

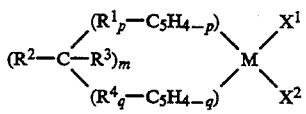  (1)

supported on a solid inorganic compound, wherein M is a transition metal of Group 4b of the Periodic Table of Elements; $X^1$ and $X^2$ are, independently, halogen, hydrogen, alkylalkoxy, saturated or unsaturated alkyl; $R^1$, $R^2$, $R^3$, and $R^4$ are, independently, hydrogen, saturated or unsaturated $C_{1-100}$ alkyl; m is an integer of 1 to 6; and p and q are, independently, an integer of 0 to 4, wherein said solid inorganic compound has been prepared by the process comprising contacting an inorganic oxide which is solid under polymerization conditions with an organometallic compound of the formula (a), (b), or (c):

$AlR'_3$  (a)

wherein R' is $C_{1-6}$ alkyl or halogen, $MgR'_2$  (b)

wherein R' is $C_{1-6}$ alkyl or halogen, or $SiR''_4$  (c)

wherein R'' is $C_{1-6}$ alkyl or halogen; and
   a catalyst component (B) containing an organic aluminum compound having formula (2)

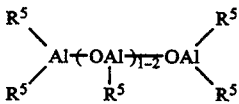  (2)

where l is an integer of 2 to 100, and $R^5$ is $C_{1-6}$ alkyl group, an organic aluminum compound of formula (3)

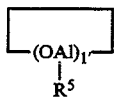  (3)

where l' is an integer of 2 to 100, and $R^5$ is a $C_{1-6}$ alkyl group or a mixture of (2) and (3).

2. The catalyst of claim 1, wherein M is titanium, zirconium or hafnium.

3. The catalyst of claim 1, wherein M is zirconium.

4. The catalyst of claim 1, wherein M is hafnium.

5. The catalyst of claim 1, wherein $X^1$ or $X^2$ are $C_{1-6}$ alkylalkoxy.

6. The catalyst of claim 1, wherein $X^1$ or $X^2$ are $C_{1-6}$ alkyl.

7. The catalyst of claim 1, wherein $X^1$ and $X^2$ are chlorine.

8. The catalyst of claim 1, wherein $R^1$ $R^2$ $R^3$, and $R^4$, independently, are $C_{1-6}$ alkyl.

9. The catalyst of claim 1, wherein groups $R^2$ and $R^3$ are bonded together; p is 2 or more and two $R^1$ groups are bonded together; or q is 2 or more and two $R^4$ groups are bonded together.

10. The catalyst of claim 1, wherein m is 1 or 2.

11. The catalyst of claim 1, wherein $R^5$ is $C_{1-6}$ alkyl.

12. The catalyst of claim 1, wherein l and l' are, independently, an integer from 6–50.

13. The catalyst of claim 1, wherein the mole ratio of component (B) to the transition metal compound in component (A) is in the range of 0.1 to 4,000.

14. A catalyst for polymerization of an olefin, comprising a solid catalyst component (A) containing a transition metal compound supported on a solid inorganic compound, and a catalyst component (B) containing an organic aluminum compound, prepared by the process comprising:
   contacting a transition metal compound having formula (1)

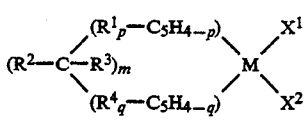  (1)

wherein M is a transition metal of Group 4b of the Periodic Table of Elements; $X^1$ and $X^2$ are, independently, halogen, hydrogen, alkylalkoxy, saturated or unsaturated alkyl; $R^1$, $R^2$, $R^3$ and $R^4$ are, independently, hydrogen, saturated or unsaturated $C_{1-100}$ alkyl; m is an integer of 1 to 6; and p and q are, independently, an integer of 0 to 4; with a solid inorganic compound to form catalyst component (A), wherein said solid inorganic compound has been prepared by the process comprising contacting an inorganic oxide which is solid under polymerization conditions with an organometallic compound of the formula (a), (b), or (c):

$$AlR_3 \quad (a)$$

wherein R is $C_{1-6}$ alkyl or halogen, $$MgR'_2 \quad (b)$$

wherein R' is $C_{1-6}$ alkyl or halogen, or $$SiR''_4 \quad (c)$$

wherein R'' is $C_{1-6}$ alkyl or halogen; and
mixing said component (A) with said component (B) containing an organic aluminum compound having formula (2)

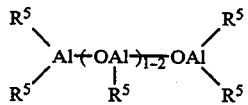

where 1 is an integer of 2 to 100, and $R^5$ is a $C_{1-6}$ alkyl group, an organic aluminum compound of formula (3)

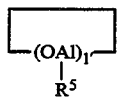

where 1' is an integer of 2 to 100, and $R^5$ is a $C_{1-6}$ alkyl group or a mixture of (2) and (3).

15. The catalyst of claim 14, wherein the mole ratio of organometal in said organometallic compound to the transition metal in said transition metal compound is from 0.01 to 10,000.

16. The catalyst of claim 14, wherein the ratio of component (B) to the transition metal compound in component (A) is in the range of 0.1 to 4,000.

17. The catalyst of claim 1, wherein said organometallic compound is selected from the group consisting of trimethylaluminum, triethylaluminum, dimethylaluminum chloride, trimethylsilane, dimethyldichlorosilane, dimethylmagnesium and methylmagnesium chloride.

18. The catalyst of claim 14, wherein said organometallic compound is selected from the group consisting of trimethylaluminum, triethylaluminum, dimethylaluminum chloride, trimethylsilane, dimethyldichlorosilane, dimethylmagnesium and methylmagnesium chloride.

* * * * *